United States Patent
Wu et al.

(10) Patent No.: US 9,341,860 B2
(45) Date of Patent: May 17, 2016

(54) ELASTIC SUPPORTING STRUCTURE AND OPTICAL IMAGE STABILIZER HAVING THE ELASTIC SUPPORTING STRUCTURE

(75) Inventors: Fu-Yuan Wu, Yangmei (TW); Shih-Ting Huang, Yangmei (TW); Jyun-Jie Lin, Yangmei (TW)

(73) Assignee: TDK Taiwan Corp. (TW)

( * ) Notice: Subject to any disclaimer, the term of this patent is extended or adjusted under 35 U.S.C. 154(b) by 981 days.

(21) Appl. No.: 13/400,799

(22) Filed: Feb. 21, 2012

(65) Prior Publication Data

US 2013/0215511 A1 Aug. 22, 2013

(51) Int. Cl.
*G02B 27/64* (2006.01)
*H04N 5/232* (2006.01)

(52) U.S. Cl.
CPC .......... *G02B 27/646* (2013.01); *H04N 5/23287* (2013.01)

(58) Field of Classification Search
CPC .......... G02B 7/023; G02B 7/026; G02B 7/04; G02B 7/09; G02B 13/001; G02B 27/64; G02B 27/646–27/648; G03B 3/10–3/12; G03B 5/02; G03B 13/32–13/36; G03B 2205/00–2205/015; G03B 2205/0053; G03B 2205/0069; H04N 5/23248; H04N 5/23264; H04N 5/2328; H04N 5/23287
USPC ................. 359/554, 557, 808, 811, 813–814, 359/819–820, 822–826; 396/52–55; 348/208.99–208.16
See application file for complete search history.

(56) References Cited

U.S. PATENT DOCUMENTS

2009/0316040 A1* 12/2009 Takatsuka et al. ............ 348/376
2012/0229926 A1* 9/2012 Wade et al. ................... 359/824

FOREIGN PATENT DOCUMENTS

WO WO 2011062123 A1 * 5/2011

* cited by examiner

*Primary Examiner* — Jennifer L. Doak
*Assistant Examiner* — James McGee

(57) ABSTRACT

An elastic supporting structure for an optical image stabilizer is provided. The optical image stabilizer includes a movable portion, a compensation module, and a plurality of suspension wires. The movable portion is provided therein with a lens. The compensation module corresponds to the movable portion, and both are located on the same image-capturing optical axis. Each suspension wire has two ends respectively connected to the movable portion and the compensation module. The movable portion is provided with an upper spring plate. One end of each suspension wire is connected to a length-increased outer line element and at least one additional auxiliary line element of the upper spring plate, and the other end of each suspension wire is connected to the compensation module, such that the movable portion corresponds to the compensation module and is spaced therefrom by a predetermined distance. Also, anti-shake function performs well with suspension wires.

18 Claims, 7 Drawing Sheets

ELASTIC SUPPORTING STRUCTURE AND OPTICAL IMAGE STABILIZER HAVING THE ELASTIC SUPPORTING STRUCTURE

BACKGROUND OF INVENTION

1. Field of the Invention

The present invention relates to an elastic supporting structure for an optical image stabilizer and, more particularly, to an elastic supporting structure for preventing a lens module from permanent deformation should the lens module be dropped, thereby providing the lens module with enhanced shock resistance.

2. Description of the Prior Art

Digital cameras have been continuously downsized due to the advancement of technology, and thanks to the miniaturization of lens modules, many small electronic devices nowadays, such as mobile phones, are equipped with digital camera functions as a basic requirement. In order to provide automatic focusing or zooming, the microlenses in those electronic devices are typically driven to move by a voice coil motor (VCM), which carries a lens and can move the lens back and forth along an image-capturing optical axis by means of a coil, a magnet and an elastic plate. Moreover, consumers have had higher and higher requirements for image quality and camera functions, and it is such advanced criteria as a 10-megapixel resolution and anti-shake systems that distinguish high-end cameras from low-end ones.

In an optical system composed of a lens module and an image compensation module, e.g., the optical system of a still camera or a video camera, the optical path tends to be shifted because of external factors or as a result of the shaking of the hand holding the camera. Should the optical path be shifted, imaging of the image compensation module will become unstable such that the images captured are blurred. The most common solution is to provide a compensation mechanism for the image blurring phenomenon caused by shaking, wherein the compensation mechanism, either digital or optical, serves to clarify the images captured.

The so-called digital compensation mechanism refers to analyzing and processing the images captured by the image compensation module so as to obtain clearer digital images. This approach is also known as the digital anti-shake mechanism. The optical compensation mechanism, on the other hand, refers to providing a vibration compensation device either on an optical lens set or on the image compensation module, and this approach is also known as the optical anti-shake mechanism. The existing optical anti-shake mechanisms typically involve complicated or bulky mechanisms or components and are therefore disadvantaged by technical complexity, difficulty of assembly, high costs, or undesirably large volumes that cannot be further downsized. In short, the known optical anti-shake mechanisms leave room for improvement.

FIG. 1 is a schematic view of the optical compensation mechanism disclosed in Japanese Patent Application Laid-Open No. 2002-207148. As shown in the drawing, the circuit substrate 301a of the image sensor 300a is supported by the flexible elements 400a to 403a, which are made of metal wires and can move perpendicular to the optical axis 201a. The X-axis and Y-axis displacements of the lens element 203a (which includes the lens 200a and the lens holder 202a) relative to the circuit substrate 301a are detected by the two relative displacement sensors 500a, 501a and the displacement detector 503a and sent to the anti-shake controller 504a so that, under the control of the anti-shake controller 504a and according to the detected displacements, the driving element 502a drives the circuit substrate 301a into corresponding movements perpendicular to the optical axis 201a, thereby preventing the image sensor 300a from generating blurred images which may otherwise result from the shaking of the image sensor 300a.

However, the mechanism proposed by the afore-cited Japanese Patent Application Laid-Open No. 2002-207148 for preventing shake-induced blurred images is only conceptual. The invention disclosed in the present application is based on a similar concept but is further incorporated with an automatic focusing module, wherein not only is resistance provided against shake-induced lateral shifting along the X axis and the Y axis, but also the lens element, when dropped, is protected from permanent (e.g., plastic) deformation in the Z-axis direction (i.e., along the image-capturing optical axis). In other words, enhanced resistance is provided against shakes resulting from the drop impact.

SUMMARY OF THE INVENTION

The primary objective of the present invention is to provide an elastic supporting structure for an optical image stabilizer, wherein an additional auxiliary line element serves to reinforce an outer line element on an upper spring plate so as to prevent an optical lens from plastic deformation along an image-capturing optical axis when dropped.

In order to achieve the aforementioned objective, the present invention provides an elastic supporting structure for an optical image stabilizer. The optical image stabilizer comprises a movable portion, a compensation module, and a plurality of first elastic elements. The optical image stabilizer is defined with an X-axis direction, a Y-axis direction, and a Z-axis direction which are mutually perpendicular. The movable portion is provided therein with a lens. The lens defines an image-capturing optical axis parallel to the Z-axis direction. Each first elastic element has two ends respectively connected to the movable portion and the compensation module such that the movable portion is supported and secured above the compensation module in the Z-axis direction. The movable portion is provided with at least a second elastic element which comprises: an outer frame connected to the movable portion, an inner frame connected to the lens, at least an inner line element extending and connected between the outer frame and the inner frame, and a plurality of coupling ends located on the outer frame. Each first elastic element has its end connected to a corresponding coupling end. Wherein, in each second elastic element, each coupling end is connected to the outer frame by an extended outer line element and at least an additional auxiliary line element. Wherein the outer line element has an end connected to each coupling end and an opposite end connected to the outer frame, and each additional auxiliary line element has an end connected to each coupling end and an opposite end connected to the outer frame.

In a preferred embodiment, each additional auxiliary line element corresponding to the coupling end has a greater length than the outer line element corresponding to the coupling end, and wherein the second elastic element and the first elastic elements are either independent and separate components or a single, integrally formed component.

In a preferred embodiment, each first elastic element is a suspension wire having a structure selected from the group consisting of: a single-line structure extending along the Z-axis direction, a suspension wire structure having a continuous S-shaped flexible portion, and a suspension wire structure having a spiral spring-shaped flexible portion.

In a preferred embodiment, each second elastic element is a spring plate, and the outer frame of each spring plate has a rectangular structure and at least two adjacent sides, each coupling end being located adjacent to a corner of a said outer frame having the rectangular structure, the outer line element and the at least an additional auxiliary line element corresponding to each coupling end of the outer frame being connected to two adjacent sides of the outer frame respectively.

In a preferred embodiment, each first elastic element is a suspension wire having a length ranging from 2 mm to 3 mm, having a diameter ranging from 0.04 mm to 0.05 mm, and made of a material having a Young's modulus of 120000 MPa, and wherein each spring plate has a thickness ranging from 0.3 mm to 0.5 mm and is made of a material having a Young's modulus of 127000 MPa.

In a preferred embodiment, each spring plate is an upper spring plate, and the movable portion is an automatic focusing module comprising: a base, a lens holder provided in the base, a coil wound around the lens holder, a plurality of magnets, a lens located on the image-capturing optical axis and provided in the lens holder, an upper cover plate covering the lens holder, an insulating plate located between the at least an upper spring plate and the base, a lower spring plate located in the base, a magnet fixing element provided at a bottom of the base and corresponding to the compensation module, two X-axis magnets oppositely provided on the magnet fixing element, and two Y-axis magnets oppositely provided on the magnet fixing element and located on lateral sides of one and the other of the two X-axis magnets. Wherein, the plurality of magnets are located on an inner periphery of the base and corresponding to the coil, the magnets and the coil jointly forming an electromagnetic driving module for driving the lens holder to move along the image-capturing optical axis. The lens holder is elastically clamped by the lower spring plate and the at least an upper spring plate.

In a preferred embodiment, the compensation module is an optical anti-shake module and comprises: a substrate having an electric circuit and corresponding to the base, a correction circuit board physically and electrically connected to the substrate, two X-axis magnet driving coils oppositely provided on the correction circuit board and corresponding to the two X-axis magnets, two Y-axis magnet driving coils oppositely provided on the correction circuit board, located on lateral sides of one and the other of the two X-axis magnet driving coils and corresponding to the two Y-axis magnets; an X-axis displacement sensor provided on the substrate for detecting a shift amount of one of the two X-axis magnets, and a Y-axis displacement sensor provided on the substrate for detecting a shift amount of one of the two Y-axis magnets.

In a preferred embodiment, each of the X-axis displacement sensor and the Y-axis displacement sensor is a displacement sensing element composed of one of: a Hall sensor, a magnetoresistance sensor (MR sensor), a fluxgate, an optical position sensor, and an optical encoder.

In a preferred embodiment, the suspension wires, the at least an upper spring plate, and the lower spring plate are electrically conductive and serve as conductive wires for delivering a driving current of the automatic focusing module.

In a preferred embodiment, the elastic supporting structure further comprises a sensing module located below the compensation module, the sensing module comprising a circuit board and an image sensing element, wherein the image sensing element is provided on the circuit board and located on the same image-capturing optical axis as the movable portion.

BRIEF DESCRIPTION OF THE DRAWINGS

The structure as well as a preferred mode of use, further objectives, and advantages of the present invention will be best understood by referring to the following detailed description of some illustrative embodiments in conjunction with the accompanying drawings, in which.

DESCRIPTION OF THE PREFERRED EMBODIMENT

Figure 1:
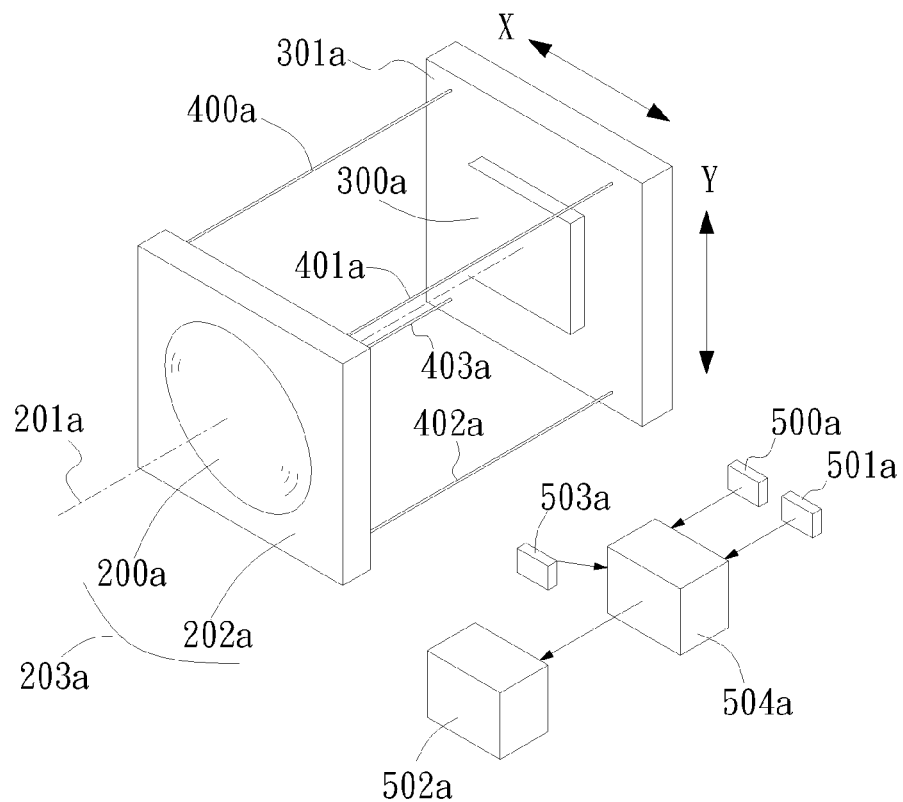
FIG. 1 is a schematic view of the mechanism disclosed in Japanese Patent Application Laid-Open No. 2002-207148.
Figure 2:
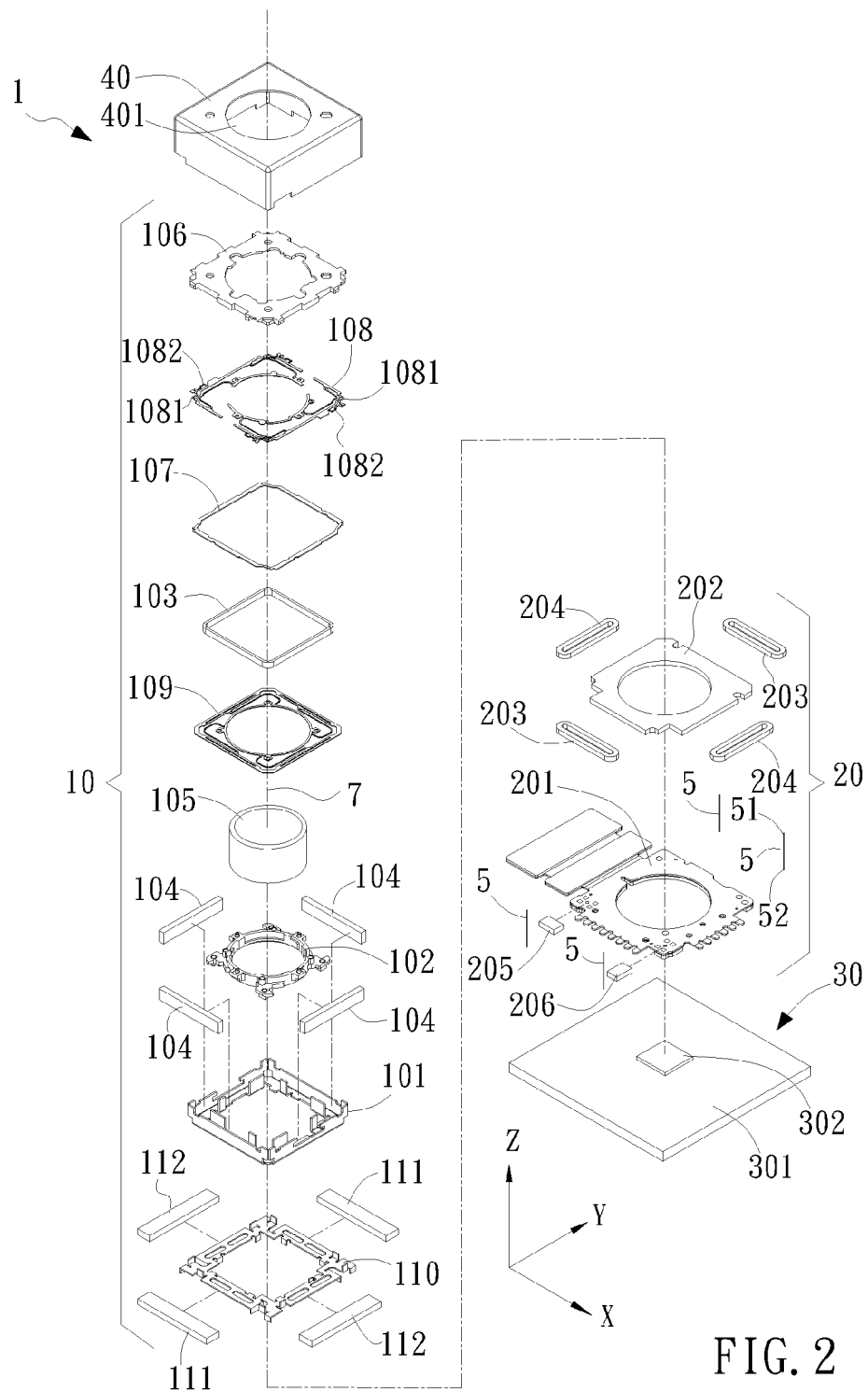
FIG. 2 is an exploded perspective view of the optical image stabilizer according to the present invention.
Figure 3:
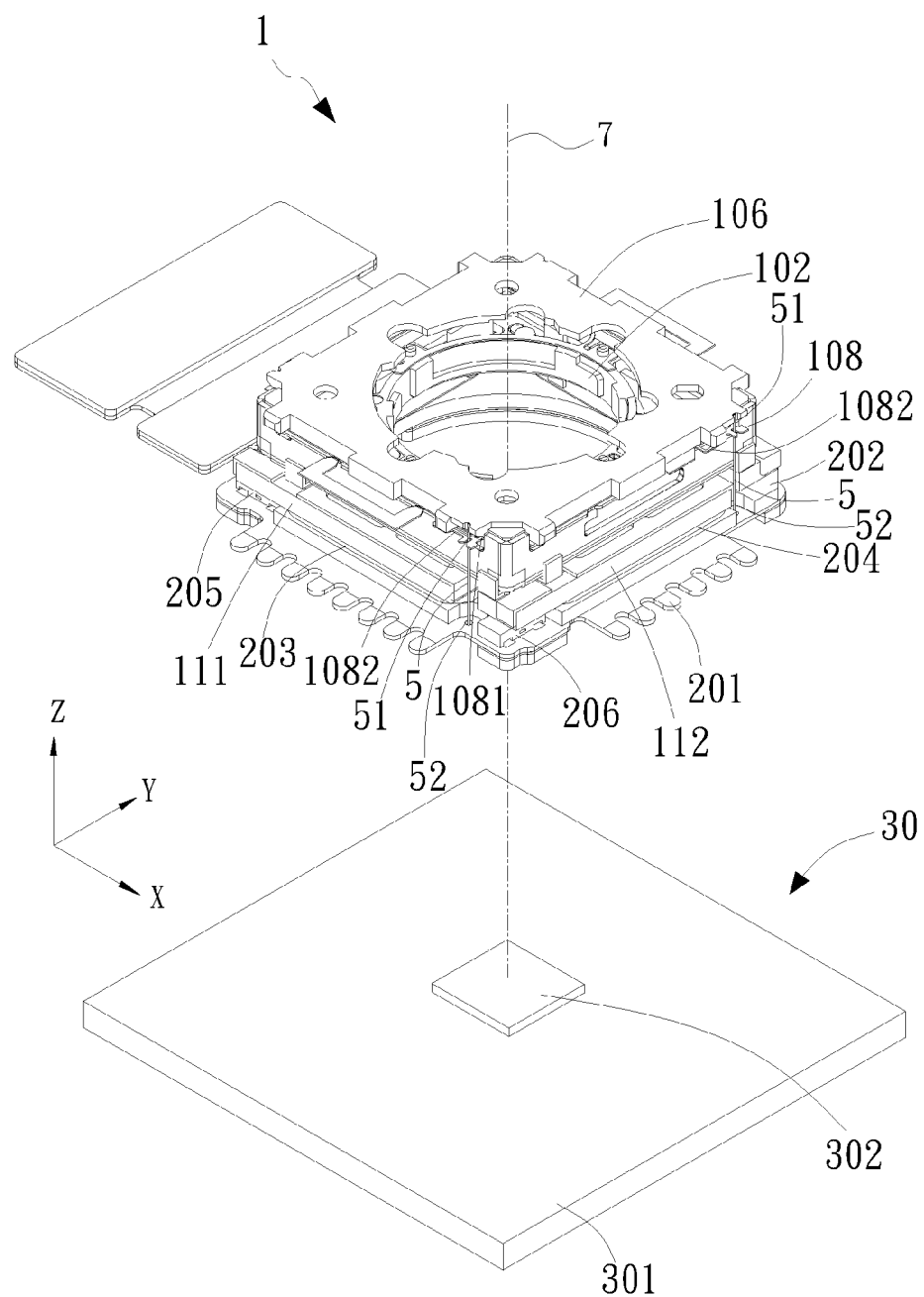
FIG. 3 is an partially assembled perspective view of the optical image stabilizer according to the present invention.

Please refer to FIGS. 2 and 3 respectively for an exploded perspective view and a partially assembled perspective view of an optical image stabilizer 1 according to the present invention.

The present invention provides an elastic supporting structure for the optical image stabilizer 1, wherein the optical image stabilizer 1 defines three axial directions that are perpendicular to one another, namely an X-axis direction, a Y-axis direction, and a Z-axis direction. The optical image stabilizer 1 includes a movable portion 10, a compensation module 20, a sensing module 30, and a plurality of first elastic elements 5. In this embodiment, the first elastic elements 5 are a plurality of suspension wires (hence the first elastic elements also referred to hereinafter as the suspension wires 5). The movable portion 10 is an automatic focusing module (hence the movable portion also referred to hereinafter as the automatic focusing module 10) or a zooming module. The movable portion 10 is provided therein with a lens 105, wherein the lens 105 defines an image-capturing optical axis 7. In another embodiment (not shown), the movable portion 10 is a lens module without an automatic focusing or zooming function. The movable portion 10 has surfaces generally parallel to the plane defined by the X and Y axes. The compensation module 20 corresponds to the movable portion 10 and is located on the image-capturing optical axis 7, which is generally parallel to the Z axis. The plural suspension wires 5 (i.e., the first elastic elements) extend generally in parallel to the Z axis. By means of a connecting end 51 and a fixed end 52 of each suspension wire 5, the automatic focusing module 10 is supported and secured relative to the compensation module 20 in the Z-axis direction such that the automatic focusing module 10, the compensation module 20, and the sensing module 30 are located generally on the same image-capturing optical axis 7. In addition, the optical image stabilizer 1 is enclosed by a housing 40. The housing 40 has a through hole 401 through which the sensing module 30, which corresponds to the automatic focusing module 10, can capture light from the outside.

In this embodiment, the automatic focusing module 10 includes a base 101, a lens holder 102, a coil 103, a plurality of magnets 104, the aforesaid lens 105, an upper cover plate 106, an insulating plate 107, a second elastic element 108, a lower spring plate 109, a magnet fixing element 110, two X-axis magnets 111, and two Y-axis magnets 112. The compensation module 20 is an optical anti-shake module for compensating for shake-induced displacements of the lens 105 at least in the Y-axis direction and the X-axis direction. The compensation module 20 includes a substrate 201, a correction circuit board 202, two X-axis magnet driving coils 203, two Y-axis magnet driving coils 204, an X-axis displacement sensor 205, and a Y-axis displacement sensor 206. In the present invention, the second elastic element 108 also has a spring-plate structure and is located in an upper portion of the automatic focusing module 10; therefore, the second elastic element is also referred to hereinafter as the upper spring plate 108.

The automatic focusing module 10 includes a voice coil motor (VCM) provided in the base 101 of the automatic focusing module 10 and carrying the lens holder 102, which is located on the image-capturing optical axis 7 (which is generally parallel to the Z axis) and holds the lens 105. More specifically, the coil 103, which is wound around the lens holder 102, and the plural magnets 104, which are provided on the inner periphery of the base 101 and correspond to the coil 103, jointly form a VCM electromagnetic driving module for driving the lens holder 102, and hence the lens 105 therein, linearly along the image-capturing optical axis 7. By varying the current input into the coil 103, different magnetic fields are generated between the coil 103 and the magnets 104 to drive the lens holder 102 back and forth along the image-capturing optical axis 7 so that zooming or focusing is carried out.

The lens holder 102 is provided in the base 101 and is elastically clamped by the elastically movable inner rings of the upper spring plate 108 (i.e., the second elastic element) and of the lower spring plate 109. Both the upper spring plate 108 and the lower spring plate 109 are elastic metal plates having thin reticulated structures formed by stamping or etching. The upper cover plate 106 covers the lens holder 102 and is connected to the base 101 to limit the range in which the lens holder 102 can be moved. The insulating plate 107 is located between the upper cover plate 106 and the upper spring plate 108 and provides insulation. The magnet fixing element 110 is provided at the bottom of the base 101 and corresponds to the compensation module 20. The two X-axis magnets 111 are provided on the magnet fixing element 110 at opposite positions. Likewise, the two Y-axis magnets 112 are provided at opposite positions on the magnet fixing element 110. The two Y-axis magnets 112 are located on the lateral sides of one and the other of the two X-axis magnets 111.

The compensation module 20 is configured for moving the automatic focusing module 10 horizontally, i.e., in a direction perpendicular to the image-capturing optical axis 7 (or more particularly, in the X-axis or Y-axis direction). The substrate 201 corresponds to the base 101 of the automatic focusing module 10. The correction circuit board 202 is connected to the substrate 201 both physically and electrically. The two X-axis magnet driving coils 203 are oppositely provided on the correction circuit board 202 and correspond to the two X-axis magnets 111. The two Y-axis magnet driving coils 204 are oppositely provided on the correction circuit board 202, are located on the lateral sides of one and the other of the two X-axis magnet driving coils 203, and correspond to the two Y-axis magnets 112. The X-axis displacement sensor 205 is provided on the substrate 201 and is configured for detecting the shift amounts of one of the two X-axis magnets 111. The Y-axis displacement sensor 206 is also provided on the substrate 201 and is configured for detecting the shift amounts of one of the two Y-axis magnets 112. The X-axis displacement sensor 205 and the Y-axis displacement sensor 206 can each be a displacement sensing element composed of one of the following: a Hall sensor, a magnetoresistance sensor (MR sensor), a fluxgate, an optical position sensor, and an optical encoder. While the magnet driving coils 203 and 204 in the embodiment shown in FIG. 2 are provided on the correction circuit board 202, those magnet driving coils 203 and 204 may, in another embodiment (not shown), be directly provided on the substrate 201 as well. In that case, the correction circuit board 202 can be dispensed with.

The sensing module 30 is located below the compensation module 20 and includes a circuit board 301 and an image sensing element 302. The image sensing element 302 is provided on the circuit board 301 and located on the same image-capturing optical axis 7 as the automatic focusing module 10. The image sensing element 302 of the sensing module 30 can capture light, or images, from the outside through the automatic focusing module 10. The suspension wires 5 are made of flexible wires. In addition, the suspension wires 5, the upper spring plate 108, and the lower spring plate 109 are all electrically conductive and serve as conductive wires for delivering the driving current of the automatic focusing module 10.

In the present embodiment, it is preferable that there are four suspension wires 5 evenly distributed around the base 101, with an equal spacing between each two adjacent suspension wires 5. The connecting ends 51 of the suspension wires 5 are connected to, and evenly distributed at the four corners of, the upper spring plate 108 of the automatic focusing module 10. More particularly, the connecting end 51 of each suspension wire 5 is connected to a length-increased outer line element 1081 and at least one additional auxiliary line element 1082 of the upper spring plate 108. Wherein, the additional auxiliary line element 1082 is spaced from the outer line element 1081. Please refer to FIGS. 4 and 5 respectively for a schematic view and a partial enlarged view of a spring plate in the optical image stabilizer according to the present invention. The upper spring plate 108 has a thin reticulated plate-like structure and includes: an outer frame 1085 connected to the base 101 of the movable portion 10, an inner frame 1086 connected to the lens 105-mounted lens holder 102, at least one inner line element 1087 extending and connected between the outer frame 1085 and the inner frame 1086, and a plurality of coupling ends 1088 located on the outer frame 1085. The connecting end 51 of each suspension wire 5 is connected to a corresponding one of the coupling ends 1088. Each coupling end 1088 of the upper spring plate 108 is connected to the outer frame 1085 by one outer line element 1081 and at least one additional auxiliary line element 1082. Each outer line element 1081 has one end connected to the corresponding coupling end 1088 and the other end connected to the outer frame 1085. Similarly, each additional auxiliary line element 1082 has one end connected to the corresponding coupling end 1088 and the other end connected to the outer frame 1085. In this embodiment for example, the outer frame 1085 of the spring plate 108 has a rectangular structure (which can be divided into halves, i.e., two separate frame portions) and has four sides and four corners. The coupling ends 1088 are located near the corners of the rectangular outer frame 1085 respectively. The outer line element 1081 and the at least one additional auxiliary line element 1082 that correspond to each coupling end 1088 are connected to two adjacent sides of the outer frame 1085 respectively.

In other words, each of the four corners of the upper spring plate 108 is provided with one coupling end 1088, which is connected to the upper spring plate 108 by one length-increased outer line element 1081 and at least one additional auxiliary line element 1082. The coupling ends 1088 are provided for securing the connecting ends 51 of the suspension wires 5 respectively. The additional auxiliary line elements 1082 of the upper spring plate 108 are curvilinear and are respectively connected to the corresponding coupling ends 1088 and hence the corresponding outer line elements 1081 so as to reinforce the outer line elements 1081, thereby preventing the maximum stress on the automatic focusing module 10, when subjected to a drop test, from exceeding the yielding stress of the outer line elements 1081. Should the former stress exceed the latter, the automatic focusing module 10 could be permanently (e.g., plastically) deformed. While only one additional auxiliary line element 1082 is provided at each corner of the outer frame 1085 in the present embodiment, it is feasible to provide two or more additional auxiliary line elements 1082 at each corner of the outer frame 1085 in other embodiments. Besides, while the upper spring plate 108 (i.e., the second elastic element) and the plural suspension wires 5 (i.e., the first elastic elements) in the present embodiment are formed as independent and separate components, the upper spring plate 108 (i.e., the second elastic element) and the suspension wires 5 (i.e., the first elastic elements) may be integrally formed as a single component in a different embodiment (not shown). For example, but without limitation, the suspension wires 5 are integrally formed with the upper spring plate 108 by a stamping or etching process such that the suspension wires 5 extend respectively and horizontally from the coupling ends 1088. Afterward, the suspension wires 5 are bent downward by 90 degrees, thus making the suspension wires 5 extend in a direction perpendicular to the horizontal surfaces of the upper spring plate 108.

The fixed end 52 of each suspension wire 5 is generally perpendicular to the Z axis and is fixed to the compensation module 20. In consequence, the automatic focusing module 10 is supported and secured above the compensation module 20 with a predetermined spacing therebetween. The material properties of the suspension wires 5 allow the automatic focusing module 10 to move perpendicular to the image-capturing optical axis 7, i.e., along the X-axis and Y-axis directions. The length of each suspension wire 5 preferably ranges from 2 mm to 3 mm and more preferably is 2.7 mm. The diameter of each suspension wire 5 preferably ranges from 0.04 mm to 0.05 mm and more preferably is 0.045 mm. In this embodiment, the suspension wires 5 are made of a material whose Young's modulus is 120000 MPa.

Differently put, the four suspension wires 5 support the automatic focusing module 10 (i.e., the movable portion) in such a way that the automatic focusing module 10 is securely located a predetermined distance above the compensation module 20 and is on the same image-capturing optical axis 7 as the sensing module 30, which is below and corresponds to the compensation module 20. The suspension wires 5 not only provide support against gravity but also, due to the flexibility of the suspension wires 5, enable displacement correction of the automatic focusing module 10 along the X axis and the Y axis. The X-axis displacement sensor 205 and the Y-axis displacement sensor 206 can sense the horizontal shift amounts of the automatic focusing module 10 in relation to the sensing module 30 while the optical image stabilizer 1 is shaken. Based on the sensing results, the two X-axis magnet driving coils 203 and the two Y-axis magnet driving coils 204 on the correction circuit board 202 respectively drive the two X-axis magnets 111 and the two Y-axis magnets 112 fixed on the magnet fixing element 110 below the automatic focusing module 10, thereby correcting the lateral shift amounts of the automatic focusing module 10, i.e., the amounts by which the automatic focusing module 10 has been shifted perpendicular to the image-capturing optical axis 7 (i.e., along the X axis and the Y axis). Consequently, the desired anti-shake function is achieved, allowing the images thus captured to have better image quality.

Figure 4:
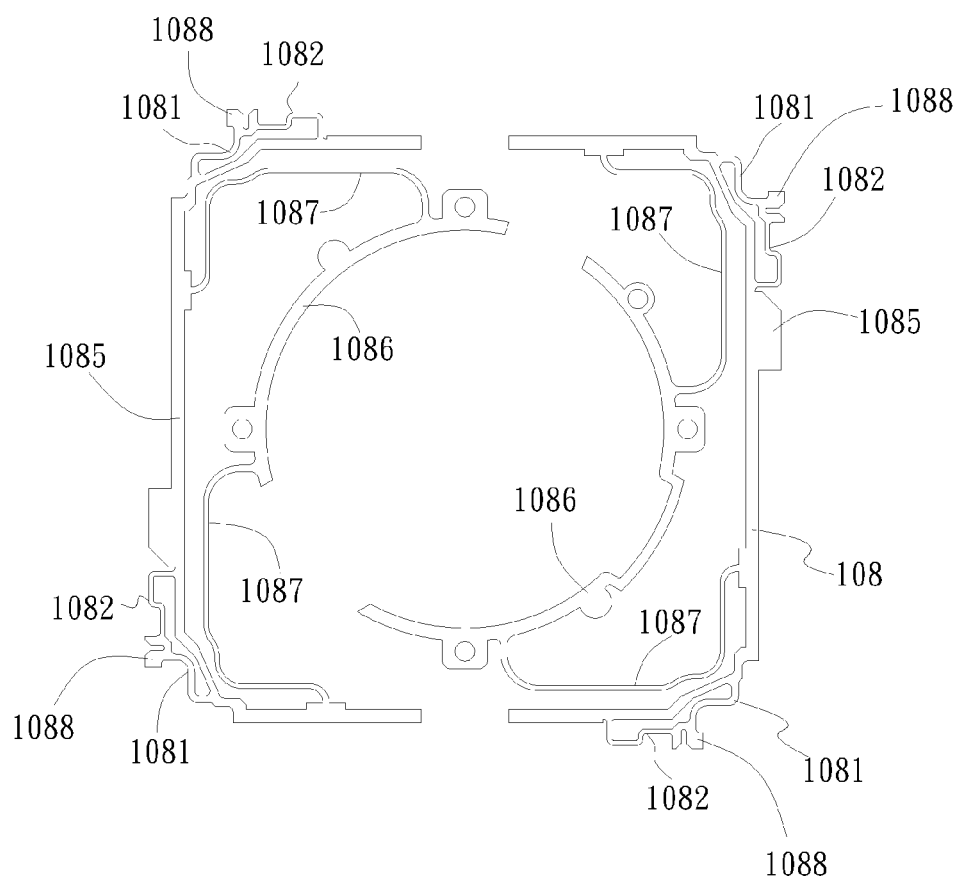
FIG. 4 schematically shows a spring plate in the optical image stabilizer according to the present invention.
Figure 5:
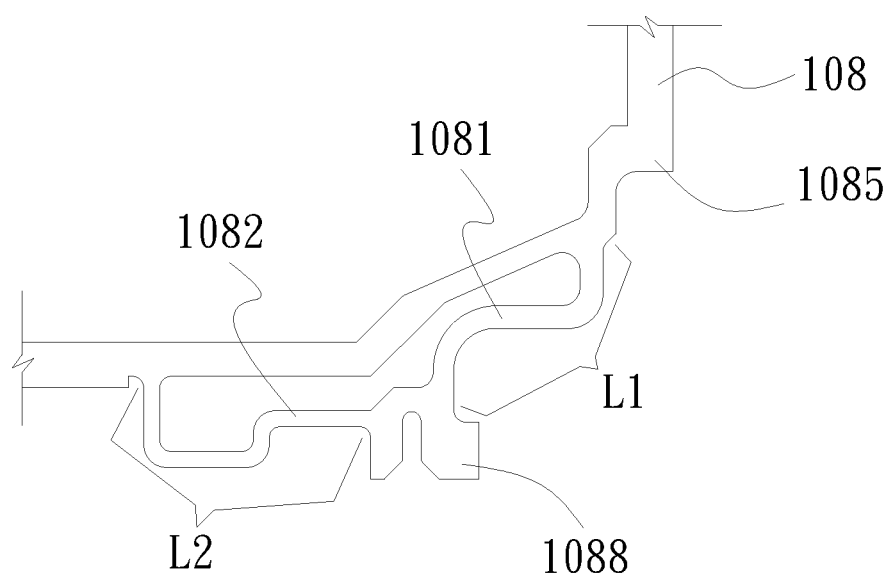
FIG. 5 is a partial view of a spring plate in the optical image stabilizer according to the present invention.
Figure 6:
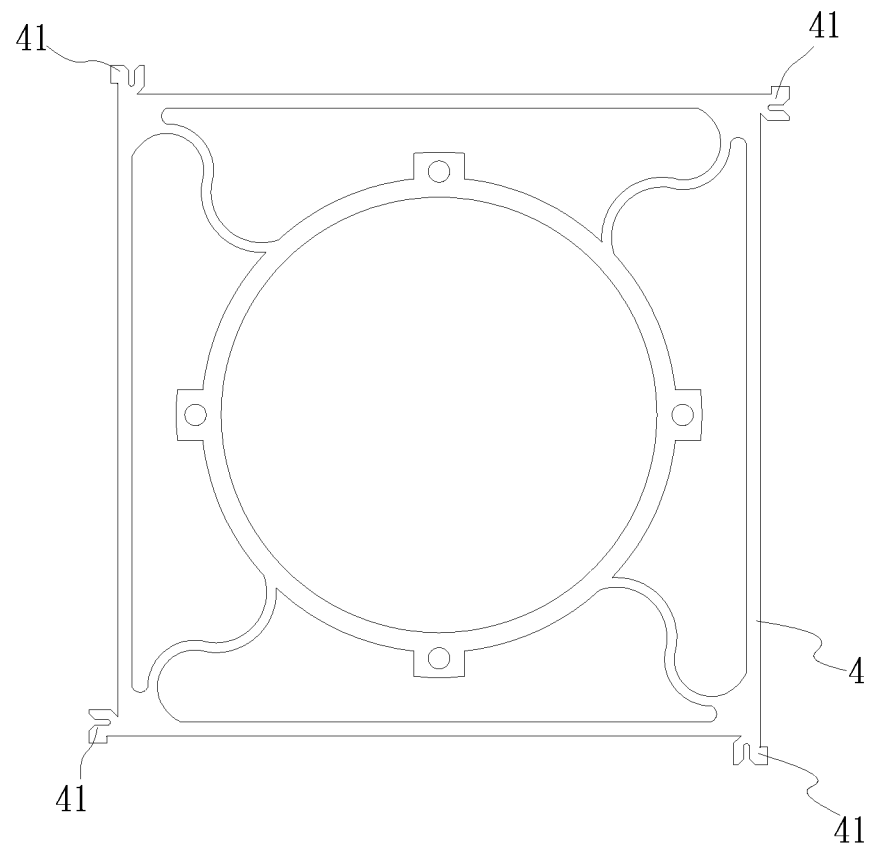
FIG. 6 schematically shows a spring plate in a conventional optical image stabilizer.

Reference is now made to FIGS. 4 through 6, wherein FIG. 6 schematically shows a spring plate in a conventional optical image stabilizer. In the present invention, the outer line elements 1081 of the upper spring plate 108 are increased in length to prevent permanent deformation (e.g., plastic deformation) which may otherwise occur if the maximum stress generated in a drop test exceeds the yielding stress of the outer line elements 1081. Furthermore, the outer line elements 1081 are reinforced by the additional auxiliary line elements 1082. With the length L2 of each additional auxiliary line element 1082 being greater than the length L1 of the corresponding outer line element 1081 (i.e., L2>L1), and the width of each additional auxiliary line element 1082 being less than that of the corresponding outer line element 1081, the automatic focusing module 10 is kept from excessive gravity-induced downward (Z-axis) displacement while at rest. According to applicable standards in the industry, the gravity-induced downward (Z-axis) displacement of the automatic focusing module 10 (i.e., the movable portion) in a rest state should be less than 0.005 mm.

Please refer to Table 1 for the stresses (MPa) experienced by the spring plate and the suspension wires of the conventional optical image stabilizer depicted in FIG. 6 in a simulated drop test in which the X-, Y-, and Z-axis displacement parameters (mm) of the movable portion (i.e., the automatic focusing module) are separately set.

TABLE 1

| Simulated displacements of | Conventional spring plate (stress) | |
|---|---|---|
| the movable portion along the X, Y, and Z axes (mm) | Suspension wires (MPa) | Spring plate (MPa) |
| X = 0.15   Y = 0.15   Z = 0.1 | 1945 | 1694 |

As shown in FIG. 6, the conventional spring plate 4 is connected to each suspension wire 5 by a single and relatively short outer line element 41. Besides, the yielding stress of the suspension wires 5 ranges generally from 930 to 1180 MPa, and the yielding stress of the conventional spring plate 4 is generally 1080 MPa. In the drop test, the simulated X-, Y-, and Z-axis displacement parameters of the movable portion are respectively set at 0.15 mm, 0.15 mm, and 0.1 mm according to the greatest possible displacements of the movable portion if the movable portion is actually dropped. When the movable portion equipped with the conventional spring plate 4 is subjected to the drop impact, the suspension wires 5 experience a stress of 1945 MPa, which is far greater than the yielding stress of the suspension wires 5 (i.e., 930 to 1180 MPa). At the same time, the spring plate 4 subjected to the drop impact is under a stress of 1694 MPa, which is far greater than the yielding stress of the conventional spring plate 4 (i.e., 1080 MPa). It can be known from the drop test data that both the conventional spring plate 4 and the suspension wires 5 will be permanently (e.g., plastically) deformed by the drop impact in practice.

As stated above, the stresses to which the spring plate 4 and the suspension wires 5 of the conventional optical image stabilizer are subjected to during the simulated drop test are greater than their respective yielding stresses (MPa). In light of this, the spring plates of the optical image stabilizer according to the present invention as shown in FIGS. 4 and 5—particularly the upper spring plate 108 fixed in the automatic focusing module 10—are so designed that each of the four corners of the upper spring plate 108 is provided with the length-increased outer line element 1081 and the additional auxiliary line element 1082 for firmly connecting with the connecting end 51 of the corresponding suspension wire 5. In addition, the fixed ends 52 of the suspension wires 5 are fixed to the compensation module 20 such that the automatic focusing module 10 is supported a predetermined distance above the compensation module 20. The foregoing design not only allows the automatic focusing module 10 to have a gravity-induced downward displacement less than 0.005 mm in a rest state, but also allows the stresses generated in the upper spring plate 108 and in the suspension wires 5 when subjected to a drop impact to be less than their respective yielding stresses (i.e., 930 to 1180 MPa and 1080 MPa, respectively). Therefore, when not subjected to any drop impact, the upper spring plate 108 can bear the stress of supporting the automatic focusing module 10, and when the automatic focusing module 10 is moved and deforms the upper spring plate 108, the resultant stress will not exceed the yielding stress of the upper spring plate 108, thus allowing the upper spring plate 108 to bring the automatic focusing module 10 back to its original position resiliently.

Table 2 shows the stresses (MPa) of a spring plate and the suspension wires of the optical image stabilizer according to the present invention in a simulated drop test in which the X-, Y-, and Z-axis displacement parameters (mm) of the movable portion (i.e., the automatic focusing module) are separately preset.

outer line elements 1081 will be so pliable that the movable portion undergoes excessive Z-axis displacement at rest. Therefore, in addition to increasing the lengths of the outer line elements 1081, the additional auxiliary line elements 1082 are required for assisting the outer line elements 1081 in supporting the weight of the automatic focusing module 10 and the impact of the drop test. In order not to compromise deformation of the outer line elements 1081, the length L1 of each additional auxiliary line element 1082 must be greater than the length L2 of the corresponding outer line element 1081. Furthermore, the thickness of the upper spring plate 108 preferably ranges from 0.3 mm to 0.5 mm and more preferably is 0.4 mm, and the Young's modulus of the upper spring plate 108 is 127000 MPa.

Referring again to Table 2, when the lengths of the outer line elements 1081 are increased, and the additional auxiliary line elements 1082 are provided, with lengths greater than those of the corresponding outer line elements 1081 (i.e., L2>L1), the suspension wires 5 are subjected to a stress of 929.5 MPa, and the upper spring plate 108 to a stress of 880.9 MPa, under the drop impact set by the X-, Y-, and Z-axis displacement parameters (0.15 mm, 0.15 mm, and 0.1 mm, respectively) in the drop test. When the X-, Y-, and Z-axis displacement parameters are set at 0.15 mm, 0.15 mm, and −0.1 mm, respectively, the resultant drop impact causes a stress of 912.2 MPa on the suspension wires 5, and a stress of 934.5 MPa on the upper spring plate 108. All the stresses stated above conform to the requirement that the stress of the suspension wires 5 be lower than the range from 930 to 1180 MPa and that the stress of the upper spring plate 108 be lower than 1080 MPa. The gravity-induced Z-axis displacement (0.00386 mm) of the movable portion 10 at rest also meets the

TABLE 2

| Simulated displacements of the movable portion along the X, Y, and Z axes (mm) | | | After the outer line elements of the upper spring plate are increased in length | | | When the additional auxiliary line elements are provided | | |
|---|---|---|---|---|---|---|---|---|
| | | | Suspension wires (MPa) | Upper spring plate (MPa) | Gravity-induced downward displacement of the movable portion at rest (mm) | Suspension wires (MPa) | Upper spring plate (MPa) | Gravity-induced downward displacement of the movable portion at rest (mm) |
| X = 0.15 | Y = 0.15 | Z = 0.1 | 871 | 734 | 0.0152 | 929.5 | 880.9 | 0.00386 |
| X = 0.15 | Y = 0.15 | Z = −0.1 | | | | 912.2 | 934.5 | |

According to Table 2, after the length of each outer line element 1081 of the upper spring plate 108 of the disclosed optical image stabilizer is increased, the outer line elements 1081 are allowed sufficient deformation to suppress deformation of the suspension wires 5 under a drop impact; consequently, the maximum stress of the suspension wires 5 is reduced. However, simply increasing the lengths of the outer line elements 1081, to which the suspension wires 5 are respectively connected, is not enough, for in the absence of the additional auxiliary line elements, and under the drop impact set by the X-, Y-, and Z-axis displacement parameters (0.15 mm, 0.15 mm, and 0.1 mm, respectively) of the automatic focusing module 10 (i.e., the movable portion) in the drop test, the gravity-induced downward displacement of the automatic focusing module 10 (i.e., the movable portion) at rest is as great as 0.0152 mm, which does not meet the requirement of being less than 0.005 mm. In other words, if permanent deformation is to be prevented in the drop test only by increasing the lengths of the outer line elements 1081, the requirement that the Z-axis displacement be less than 0.005 mm. Thus, the afore-mentioned drawbacks of the prior art are overcome.

Figure 7A:
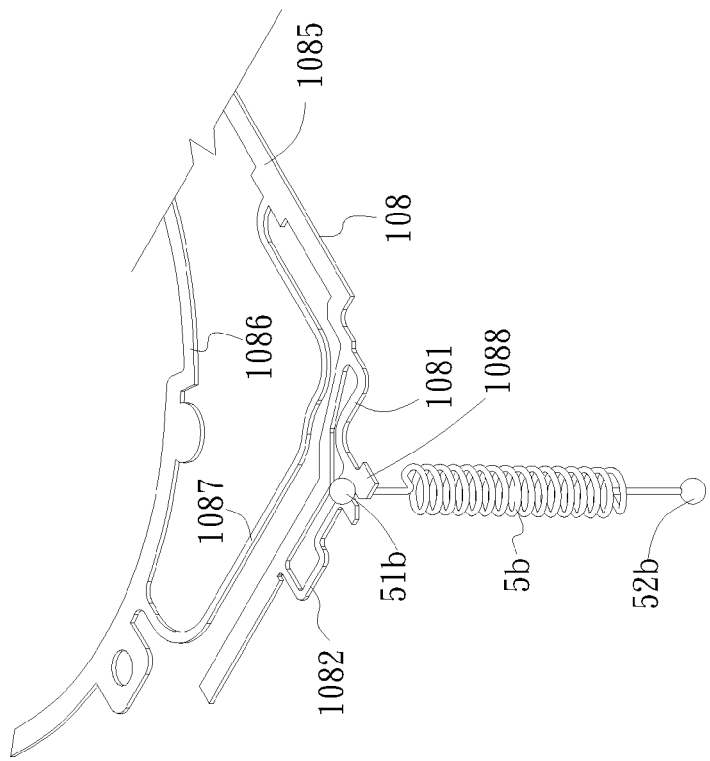
FIGS. 7A and 7B respectively show the second and the third embodiments of a suspension wire in the optical image stabilizer according to the present invention.
Figure 7B:
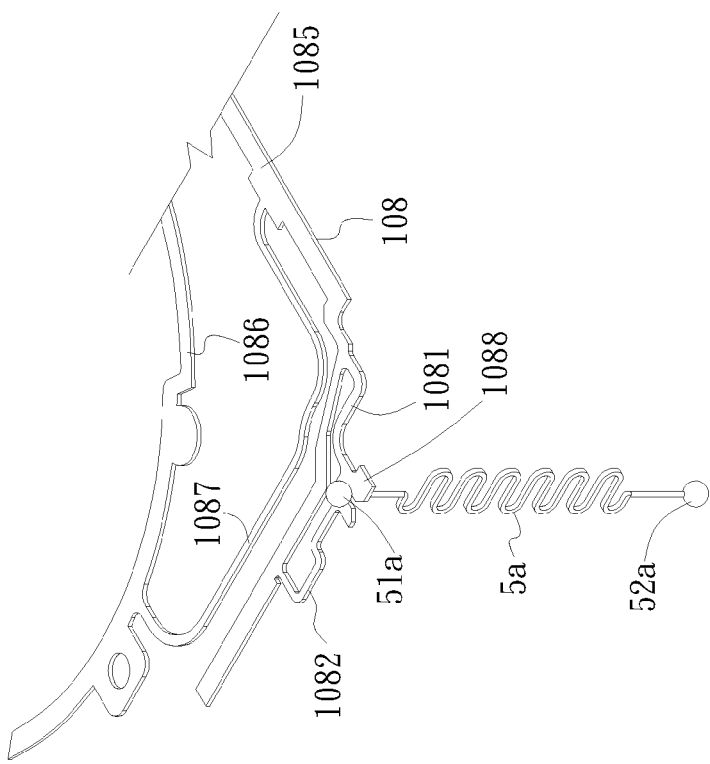

Please refer to FIGS. 7A and 7B for the second and the third embodiments of the suspension wires of the optical image stabilizer according to the present invention. Aside from the structure depicted in FIGS. 2 and 3 which is a single-line structure extending in the Z-axis direction, each suspension wire of the disclosed optical image stabilizer may have a suspension wire 5a structure formed with a continuous S-shaped flexible portion (i.e., the second embodiment shown in FIG. 7A) or a suspension wire 5b structure formed with a spiral spring-shaped flexible portion (i.e., the third embodiment shown in FIG. 7B). The upper ends (i.e., the connecting ends 51a, 51b) and the lower ends (i.e., the fixed ends 52a, 52b) of the suspension wires 5a, 5b are connected to the coupling ends 1088 of the upper spring plate 108 and the substrate 201 of the compensation module 20 respectively, as in the previous embodiment. The continuous S-shaped or spiral spring-shaped flexible portion not only provides the suspension wires 5a, 5b with relatively great horizontal flexibility (i.e., in the X- and Y-axis directions), but also allows the suspension wires 5a, 5b to extend slightly in the Z-axis direction.

While the present invention has been particularly shown and described with reference to a preferred embodiment, it will be understood by those skilled in the art that various changes in form and detail may be without departing from the spirit and scope of the present invention.

What is claimed is:

1. An optical image stabilizer having an elastic supporting structure, the optical image stabilizer defining an X-axis direction, a Y-axis direction, and a Z-axis direction which are mutually perpendicular, the optical image stabilizer comprising:
    a movable portion provided therein with a lens, the lens defining an image-capturing optical axis parallel to the Z-axis direction;
    a compensation module configured as an optical anti-shake module for compensating for shake-induced displacements of the lens at least in the Y-axis direction and the X-axis direction; and
    a plurality of first elastic elements, each said first elastic element having two ends respectively connected to the movable portion and the compensation module such that the movable portion is supported and secured above the compensation module in the Z-axis direction;
    wherein the movable portion is provided with at least a second elastic element comprising: an outer frame connected to the movable portion, an inner frame connected to the lens, at least an inner line element extending and connected between the outer frame and the inner frame, and a plurality of coupling ends located on the outer frame, each said first elastic element having a said end connected to a corresponding said coupling end; and wherein in each said second elastic element, each said coupling end is connected to the outer frame by exactly two line elements comprising an outer line element and an additional auxiliary line element, wherein each outer line element has an end connected to each said coupling end and an opposite end directly connected to the outer frame, and each said additional auxiliary line element has an end directly connected to each said coupling end and an opposite end connected to the outer frame;
    wherein each said second elastic element is a spring plate, and the outer frame of each said spring plate has a rectangular structure and at least two adjacent sides, each said coupling end being located adjacent to a corner of said outer frame having the rectangular structure, the outer line element and the additional auxiliary line element corresponding to each said couple end of aid outer frame being connected to two adjacent said of the outer frame respectively.

2. The optical image stabilizer of claim 1, wherein each said additional auxiliary line element corresponding to a said coupling end has a greater length than the outer line element corresponding to the coupling end, and wherein the at least a second elastic element and the first elastic elements are either independent and separate components or a single, integrally formed component.

3. The optical image stabilizer of claim 1, wherein each said first elastic element is a suspension wire having a structure selected from the group consisting of: a single-line structure extending along the Z-axis direction, a suspension wire structure having a continuous S-shaped flexible portion, and a suspension wire structure having a spiral spring-shaped flexible portion.

4. The optical image stabilizer of claim 1, wherein each said first elastic element is a suspension wire having a length ranging from 2 mm to 3 mm, having a diameter ranging from 0.04 mm to 0.05mm, and made of a material having a Young's modulus of 120000 MPa, and wherein each said spring plate has a thickness ranging from 0.3 mm to 0.5 mm and is made of a material having a Young's modulus of 127000 MPa.

5. The optical image stabilizer of claim 1 wherein each said spring plate is an upper spring plate, and the movable portion is an automatic focusing module comprising:
    a base;
    a lens holder provided in the base:
    a coil wound around the lens holder:
    a plurality of magnets located on an inner periphery of the base and corresponding to the coil, the magnets and the coil jointly forming an electromagnetic driving module for driving the lens holder to move along the image-capturing optical axis;
    a lens located on the image-capturing optical axis and provided in the lens holder;
    an upper cover plate covering the lens holder:
    an insulating plate located between the upper cover plate and the upper spring plate;
    a lower spring plate located in the base, the lens holder being elastically clamped by the lower spring plate and the upper spring plate;
    a magnet fixing element provided at a bottom of the base and corresponding to the compensation module;
    two X-axis magnets oppositely provided on the magnet fixing element; and
    two Y-axis magnets oppositely provided on the magnet fixing element and located on lateral sides of one and the other of the two X-axis magnets.

6. The optical image stabilizer of claim 5, wherein the first elastic elements, the upper spring plate, and the lower spring plate are electrically conductive and serve as conductive wires for delivering a driving current of the automatic focusing module.

7. The optical image stabilizer of claim 5 wherein the compensation module is an optical anti-shake module and comprises:
    a substrate having an electric circuit and corresponding to the base;
    a correction circuit board physically and electrically connected to the substrate;
    two X-axis magnet driving coils oppositely provided on the correction circuit board and corresponding to the two X-axis magnets;
    two Y-axis magnet driving coils oppositely provided on the correction circuit board, located on lateral sides of one and the other of the two X-axis magnet driving coils, and corresponding to the two Y-axis magnets;
    an X-axis displacement sensor provided on the substrate for detecting a shift amount of one of the two X-axis magnets; and
    a Y-axis displacement sensor provided on the substrate for detecting a shift amount of one of the two Y-axis magnets.

8. The optical image stabilizer of claim 7, wherein each of the X-axis displacement sensor and the Y-axis displacement sensor is a displacement sensing element composed of one of: a Hall sensor, a magnetoresistance sensor (MR sensor), a fluxgate, an optical position sensor, and an optical encoder.

9. The optical image stabilizer of claim 1, further comprising a sensing module located below the compensation module, the sensing module comprising a circuit board and an image sensing element, wherein the image sensing element is provided on the circuit board and located on the same image-capturing optical axis as the movable portion.

10. An elastic supporting structure for an optical image stabilizer, the optical image stabilizer comprising a movable portion, a compensation module, and a plurality of first elastic elements, the optical image stabilizer defining an X-axis direction, a Y-axis direction, and a Z-axis direction which are mutually perpendicular, the movable portion being provided therein with a lens, the lens defining an image-capturing optical axis parallel to the Z-axis direction, each said first elastic element having two ends respectively connected to the movable portion and the compensation module such that the movable portion is supported and secured above the compensation module in the Z-axis direction, the movable portion being provided with at least a second elastic element comprising: an outer frame connected to the movable portion, an inner frame connected to the lens, at least an inner line element extending and connected between the outer frame and the inner frame, and a plurality of coupling ends located on the outer frame, each said first elastic element having a said end connected to a corresponding said coupling end, the elastic supporting structure being characterized in that:
  in each said second elastic element, each said coupling end is connected to the outer frame by exactly two elongated line elements, comprising an outer line element and at least an additional auxiliary line element, wherein the each outer line element has an end connected to the each said coupling end and an opposite end directly connected to the outer frame, and each said additional auxiliary line element has an end connected to the each said coupling end and an opposite end directly connected to the outer frame;
  wherein each said second elastic element is a spring plate, and the outer frame of each said spring plate has a rectangular structure and at least two adjacent sides, each said coupling end being located adjacent to a corner of said outer frame having the rectangular structure, the outer line element and the additional auxiliary line element corresponding to each said coupling end of said outer frame being connected to two adjacent said sides of the outer frame respectively.

11. The elastic supporting structure of claim 10, wherein each said additional auxiliary line element corresponding to a said coupling end has a greater length than the outer line element corresponding to the coupling end, and wherein the at least a second elastic element and the first elastic elements are either independent and separate components or a single, integrally formed component.

12. The elastic supporting structure of claim 10, wherein each said first elastic element is a suspension wire having a structure selected from the group consisting of: a single-line structure extending along the Z-axis direction, a suspension wire structure having a continuous S-shaped flexible portion, and a suspension wire structure having a spiral spring-shaped flexible portion.

13. The elastic supporting structure of claim 10, wherein each said first elastic element is a suspension wire having a length ranging from 2 mm to 3 mm; having a diameter ranging from 0.04 mm to 0.05 mm, and made of a material having a Young's modulus of 120000MPa, and wherein each said spring plate has a thickness ranging from 0.3 mm to 0.5 mm and is made of a material having a Young's modulus of 127000 MPa.

14. The elastic supporting structure of claim 10, wherein each said spring plate is an upper spring plate, and the movable portion is an automatic focusing module comprising:
  a base;
  a lens holder provided in the base;
  a coil wound around the lens holder;
  a plurality of magnets located on an inner periphery of the base and corresponding to the coil, the magnets and the coil jointly forming an electromagnetic driving module for driving the lens holder to move along the image-capturing optical axis;
  a lens located on the image-capturing optical axis and provided in the lens holder:
  an upper cover plate covering the lens holder;
  an insulating plate located between the upper cover plate and the upper spring plate;
  a lower spring plate located in the base, the lens holder being elastically clamped by the lower spring plate and the upper spring plate;
  a magnet fixing element provided at a bottom of the base and corresponding to the compensation module;
  two X-axis magnets oppositely provided on the magnet fixing element; and
  two Y-axis magnets oppositely provided on the magnet fixing element and located on lateral sides of one and the other of the two X-axis magnets.

15. The elastic supporting structure of claim 14, wherein the first elastic elements, the upper spring plate, and the lower spring plate are electrically conductive and serve as conductive wires for delivering a driving current of the automatic focusing module.

16. The elastic supporting structure of claim 14, wherein the compensation module is an optical anti-shake module and comprises:
  a substrate having an electric circuit and corresponding to the base;
  a correction circuit board physically and electrically connected to the substrate;
  two X-axis magnet driving coils oppositely provided on the correction circuit board and corresponding to the two X-axis magnets;
  two Y-axis magnet driving coils oppositely provided on the correction circuit board, located on lateral sides of one and the other of the two X-axis magnet driving coils, and corresponding to the two Y-axis magnets;
  an X-axis displacement sensor provided on the substrate for detecting a shift amount of one of the two X-axis magnets; and
  an Y-axis displacement sensor provided on the substrate for detecting a shift amount of one of the two Y-axis magnets.

17. The elastic supporting structure of claim 16, wherein each of the X-axis displacement sensor and the Y-axis displacement sensor is a displacement sensing element composed of one of: a Hall sensor, a magnetoresistance sensor (MR sensor), a fluxgate, an optical position sensor, and an optical encoder.

18. The elastic supporting structure of claim 10, further comprising a sensing module located below the compensation module, the sensing module comprising a circuit board and an image sensing element, wherein the image sensing element is provided on the circuit board and located on the same image-capturing optical axis as the movable portion.

* * * * *